Jan. 14, 1958  J. SALAUZE  2,820,078
GALVANIC CELL ELECTRODES AND METHOD OF MAKING THE SAME
Filed March 12, 1954
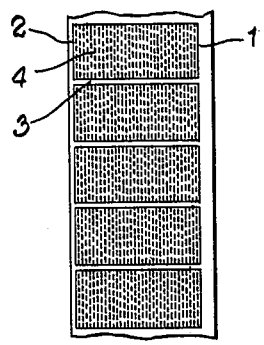
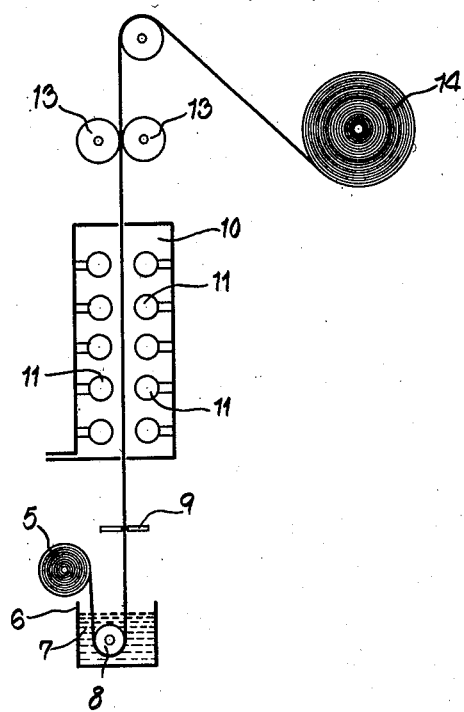
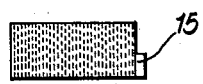
INVENTOR.
JEAN SALAUZE
BY
*Kenyon & Kenyon*
ATTORNEYS ered Jan. 14, 1958

2,820,078

GALVANIC CELL ELECTRODES AND METHOD OF MAKING THE SAME

Jean Salauze, Paris, France, assignor to Societe des Accumulateurs Fixes et de Traction (Societe Anonyme), Pont de la Folie, Romainville, France, a company of France Application March 12, 1954, Serial No. 415,749

Claims priority, application France March 17, 1953

16 Claims. (Cl. 136—19)

This invention relates to electrodes for galvanic cells, and has as an object the production, by a novel method, of improved electrodes, or plates, which make possible discharge rates higher than those heretofore possible with correspondingly low voltage drop. Other objects of my invention will be made apparent by the following specification.

The capacity for discharge at extremely high rates is more and more required from galvanic cells. In other words it is desired to have a cell whose voltage remains at a relatively high level while, at the same time, it is able to deliver discharge currents whose intensity expressed in amperes would be 20 to 30 times the capacity of the cell expressed in ampere-hours. For this purpose, the surface of the plates has to be considerably increased, that is, a great number of very thin plates must be used, providing a great surface per capacity unit. Moreover, it is essential to use active materials which are themselves highly divided so as to facilitate to the utmost the electrochemical exchanges. The large number of such plates required for a given capacity means a very high cost price when the plates are manufactured by known methods.

The present invention provides novel plates and a process of continuous manufacture of such plates for alkaline primary and secondary cells which is both simple and economical. Moreover, my novel process makes it possible to prepare plates of various thicknesses, and particularly very thin plates. We may also use active material in highly divided form, which is an essential condition for quick electrochemical exchanges. Finally the process is very general of application, for it may be applied whenever the active material to be used is in finely divided form.

The process, essentially, consists in coating both faces of a continuously moving perforated metallic band with a suspension of an intimate mixture of the active material and of acicular or arborescent copper microcrystals in water or in any other suitable volatile liquid in which has been dissolved a material imparting a high viscosity to the solution. The band next runs through a dryer in order to dry the coating. Then the band and the coats are compressed between two rolls, in order to produce interlacing of the copper crystals. Finally, the band is cut up into pieces corresponding to the required plate dimensions.

In the drawings:

Fig. 1 shows a view of a preferred embodiment of the carrying band;

Fig. 2 shows a diagrammatic view of a preferred embodiment of the manufacturing process; and Fig. 3 is a plan view of a plate obtained after the cutting of the band prepared according to the process.

The supporting member or core of my novel plates is constituted of a long metallic band. It is made of a metal substantially unaffected by the electrolyte of the galvanic cell. However, this is no essential condition, when the plate is to be used in quick deferred action type batteries. Practically, nickel, copper, and iron will be mainly used for economic reasons. Moreover, the metal of the band can be coated with thin layers of other metals, either by electroplating, or by spraying, or by any other appropriate means. The band may be either a solid band or a screen with a mesh a few millimetres in width. Solid bands, such as obtained through rolling, are especially convenient for use.

The thickness of the band may vary to a certain extent according to the surface and thickness of the plates which are to be obtained, and also according to the intensity of the discharge currents which are required from the galvanic cell. The thickness of the band may be from 0.05 millimetre up to 0.15 millimetre, or even more, if it is necessary.

In order to make the further band-cutting operation easier, it is advisable that the width of the band should be a multiple of the length or the width of the plates to be obtained. In a preferred embodiment of the invention, shown in Fig. 3, the width of the band is merely equal to the length of the plate.

When a solid band is used it is first perforated by stamping or any other mechanical process. The perforations may assume various geometrical shapes. However, it is advisable to use circular perforations with approximately 1 to 3 millimetres diameter, the said perforations being regularly distributed, so that the perforated surface may be about 30 to 60% of the total surface. During the perforating step, there will preferably be left a non-perforated zone 1, of sufficient width, so that the plate-head (15, Fig. 3) can later be cut from it. On the other side of the band, the edge 2 a few millimetres wide, intended to be the bottom of the plates, is preferably similarly left unperforated. Finally, cross zones 3, a few millimetres wide, will also be left imperforate. The plates are to be made by shearing crosswise within the zones 3 of the band. Quadrilaterals 4 are perforated. Of course, the non-perforated zone disposition varies according to each different cutting method. Besides, the non-perforated zone arrangement is not essential; it is only useful.

It is obvious that this perforating step becomes unnecessary when a screen is used as the band.

After the above described mechanical preparation, the band is preferably first nickel plated by passing it through a conventional nickel plating bath. Both faces of the band are thus covered with a nickel coat, a few microns thick. The operation is not absolutely necessary; however it is useful when the band is made of copper or iron, the metals being so protected against corrosion or further attack.

The product to be coated on the faces of the band will be an intimate mixture of copper microcrystals having acicular or arborescent shapes, and of suitably divided active material. The said copper crystals, because of their physical shape, can easily interlace under pressure, thereby forming a sort of coherent stuffing. They still retain their interlacing property even when mixed up, in a suitable ratio, with pulverulent active material. In the coherent stuffing which is produced, the active material is located in a copper current conductor net. The arborescent copper microcrystals can be prepared in different ways, such as for instance by the sudden action of a more electronegative metal being introduced into an aqueous solution of a copper salt. But the most convenient process is the electrolysis of an acid sulphate copper solution by using a strong current density on the cathode. Such processes are already known.

The active material to be mixed up with copper must be suitably divided. The volume of the grains of which it is composed must be in keeping with the size of the copper microcrystals. When the active material powder is too fine, or when, on the contrary, it is too thick, we find it difficult to obtain a coherent solid by a strong compression on the mixture. I have found that when copper powder having an apparent density of approximately 1 is used, the particles of the active material to be mixed up with copper, must be able to pass through a screen having 100 meshes to the linear inch.

The proportions of copper and of active material to be used depend partly upon the active material being more or less fine, and partly upon the physical shape of the said active material. According to its nature, the active material itself may have interlacing properties; in that case, the amount of copper to be used may be comparatively low. But some active materials, either because they are too fine, or because their physical shapes do not make their interlacing easy, require comparatively large quantities of copper. Practically, I prefer to use an amount of copper from 30 to 70% of the total weight of the mixture, the said mixture being obtained by mixing the active material and the copper together for a few minutes. A mixer of the Werner-Pfleiderer type may be used to good advantage for this purpose.

Many active materials can be used. An object of the present invention, but not to be construed as limiting the invention, is the use, in the negative plate of the alkaline battery, of iron-base and cadmium-base active materials.

Cadmium may be used in three different chemical forms, the metal, oxide or hydrate. It can either be taken by itself, or may be mixed with suitable quantities of metallic iron or iron oxide. The quantity of iron to be added in this way does not generally amount to more than 30% of the total mixture, so that cadmium is the most important element. The so-called "spongy" form resulting from the electrolysis of a mixture of cadmium and iron salts by using a high current density on the cathode is the preferred physical form. Spongy cadmium, having acicular or arborescent microcrystals, also has interlacing properties, and therefore only requires such small amounts of copper microcrystals as 30% or even less. When a mixture of cadmium oxide or hydrate and iron or iron oxide in quantities not greater than 30% is used, it becomes more difficult to produce a coherent solid under pressure. It is advisable, then, to use more copper microcrystals, namely 50% to 70% about, of the total weight.

Iron may be used in the divided form, in the metallic or oxide condition. The divided metal can be prepared according to any known process; the most efficient one consists in reducing by hydrogen, at 500°, a ferric oxide having an apparent density equal to approximately 1. The divided iron oxide to be used preferably, is magnetic oxide $Fe_3O_4$; the best way to prepare it, is to reduce by hydrogen, at about 250–300°, ferric oxide having an apparent density equal to approximately 1.

The following step consists in preparing a suspension of a mixture of the active material and copper microcrystals in a liquid medium of a high viscosity. This medium can be any volatile liquid which does not alter or react with the active material and in which suitable products are dissolved in order to give sufficient viscosity to the medium, so that the active material may remain in suspension without leaving any deposit. The suspension, therefore, remains homogeneous, and its composition remains constant. Water is the most practical and economical liquid. In order to have a sufficient viscosity, a few percent by weight of such organic products as alginates, gelatins, starch and more particularly such soluble cellulose derivatives, as the alkaline or ammonium salts of the carboxymethylcellulose, the methylcelluloses, the hydroxyalkylcelluloses; hydroxyethylcelluloses and hydroxypropylcelluloses are dissolved in the suspension. The cellulose derivatives, particularly, used in very small amounts, give a viscosity as high as 4,000 centipoises, though such high viscosity is not required. Moreover, these cellulose derivatives give the suspension good adhesive properties. The amount of the organic product to be used depends upon its chemical nature and more particularly upon the degree of viscosity it may give. Usually the quantity varies between 1 and 5%. Besides, there is no regular rule of proportionality between the quantity of liquid and the quantity of metallic powder used to prepare the suspension. The amount of powder to be introduced into a given volume of the liquid greatly depends upon the crystalline shape, the size and especially the extent of ramifications of the crystals. The two following examples are given by way of illustration and not to be construed as limiting the invention.

*Example I.*—One mixes up for a few minutes in a mixer:

| | |
|---|---|
| Water | litres__ 10 |
| Sodium salt of the carboxymethylcellulose | grams__ 300 |
| Pulverulent mixture of 30% in weight of copper microcrystals and 70% of spongy cadmium | kg__ 10 |

*Example II.*—One mixes up for a few minutes in a mixer:

| | |
|---|---|
| Water | litres__ 10 |
| Sodium salt of the carboxymethylcellulose | grams__ 400 |
| Pulverulent mixture of 50% in weight of copper microcrystals and 50% of magnetic oxide $Fe_3O_4$ | kg__ 13 |

Fig. 2 shows, in diagrammatic manner, a preferred embodiment of a device for carrying out my method of manufacture. The viscous mixture 7, prepared according to the previous description, is put into the container 6. The long perforated band is unwound from roll 5 passing under roll 8 which is submerged in the mixture. As the band passes through the mixture, both faces and the inside of the perforations get covered with a rather thick layer of the viscous suspension. The total thickness of the viscous layer which is left on the band and on which the thickness and capacity of the plates depends, is controlled by the passage of the band through and in contact with the edges of a slot of adjustable width 9. The slot is preferably made in such a conformation as to substantially completely remove the coatings which cover zones 1 and 2 of the band, as the band passes through.

Next, the band passes into a dryer 10 where the remaining liquid is evaporated. The said dryer can be heated by any appropriate heating means, such as electrical resistance, steam coils, etc. However, the preferred heating process consists in using infra-red radiations such as produced, for instance, by infra-red lamps 11. By means of infra-red heating, the effect of the drying is more homogeneous for it is carried on inside the mass of the active material itself, and cracks upon the coatings may consequently be avoided. In order to avoid oxidation, which could arise during the drying operation, it is advisable to maintain an atmosphere of inert or reducing gas within the dryer 10. For this purpose the dryer is supplied with any suitable gas, such as hydrogen, carbonic gas, nitrogen, cracked ammonia gas, etc., which may be introduced through the pipe 12. The excess of the gas escapes from the openings provided in the walls of the dryer for the inlet and outlet of the band.

The band leaves the dryer in a dry condition. It then passes between two rolls 13, adjustably spaced, which compress very strongly the coatings of active material-copper microcrystals. A compression of at least one ton per square centimetre is necessary. Owing to this strong compression, a fine interlacing of copper microcrystals is produced, thereby forming a sort of stuffing which carries the active material inside it. The interlacing, of course, also occurs between the copper microcrystals which are located in the perforations of the carrying band. Numerous links or connections, therefore, are established between both layers covering both faces of the carrying band. The result is that the layers of the mixture of active material and copper microcrystals are strongly held to the carrying band and exhibit a good cohesion, as well.

The band so prepared is wound up around the driven roll 14 which, by turning, unwinds the band from roll 5 and draws it through the device which has just been described. Rolls 13 are preferably also driven, and their motion is synchronized with the movement of the band.

The above description discloses a preferred embodiment of the electrode manufacture. However, in some cases, depending upon the nature of the active material to be used and more particularly upon its melting point, one may pass the band covered with dry and compressed coatings through a sintering furnace in order to sinter the copper microcrystals, increasing thereby the adherence and cohesion of the coatings which cover both faces of the band. The said furnace, which is not shown in drawing 2, is placed between the roll 13 and the roll 14. It may be heated by any appropriate means to a temperature equal to approximately three-quarters the melting temperature of copper, expressed in degrees C., and provided with a non-oxidizing, i. e. a neutral or slightly reducing atmosphere. The sintering operation is advisable when the mixture covering both faces of the band is a mixture of iron or magnetic iron oxide and of copper microcrystals.

The result of the above-described process is a band of carrier metal with coatings of interlaced copper microcrystals and active material. It is next cut into the desired shapes, which may be as shown in Fig. 3, or any other required shape, by apparatus known in the art. Where the perforations have been arranged as above described, the cutting will preferably be along the imperforated portions 3 of Fig. 1. It is, of course, also possible, and in many cases preferable, to cut the finished band into plates without first winding it on roll 14. In that case, a pair of pinch rolls may be used to draw or propel the strip. In the non-perforated part of zone 1, the head of the plate shown at 15, in drawing 3, is cut up according to need. When electrodes of very large dimensions are wanted, such for instance, as those used in winding assemblies, the zone 1 may be supplied with several terminal lugs.

It is not essential to prevent the formation of an active material coating on the zone 1, as by removing the coating from this zone while passing through slot 9. In that case, it is sufficient to mash the active material by a very strong local compression, and to fashion out of it the head of the plate and the lug.

Reference is herewith made to my copending applications Serial Nos. 415,747 and 415,748 both filed March 12, 1954, and containing disclosures of related but different inventions.

The assembly of the plates prepared as has been described in primary or secondary batteries, does not differ from the usual industrial processes.

It is obvious that variations may be made in the method of procedure which has been described without departing from the spirit of the invention.

What is claimed is:

1. A method of producing plates for galvanic cells comprising maintaining an aqueous suspension consisting of an intimate pulverulent mixture of active material and copper microcrystals having interlacing properties, water and a viscosity increasing agent dissolved therein, continuously passing a perforated band through the said suspension without agitation and thereby coating both sides of said band and filling the perforations therein with the suspension, then passing the strip through a slot whereby the edges of said slot contact the coating to remove excess thereof and to control the thickness of the final coatings, thereafter passing the band successively through a heated drying chamber wherein the coatings are dried and between pressure rolls where pressure of at least 1 ton per square centimeter without application of heat is applied to the dry coatings effecting interlacing of the said microcrystals, and cutting the band into plates.

2. A method according to claim 1 in which the band is a metal selected from the group consisting of nickel, copper and iron.

3. A method according to claim 1, in which the band is a metal selected from the group consisting of iron and copper and plated upon both faces thereof with an adherent nickel layer between about 1 and about 5 microns thick.

4. A method according to claim 1 in which the band is a metallic screen having a mesh between about 2 and about 5 millimetres wide.

5. A method according to claim 1, in which the band is between about 0.05 and about 0.15 millimetre thick and has perforations having a diameter from about 1 to 3 millimetres, the said perforations being uniformly distributed upon the whole surface of the band, except for both edges of said band and narrow cross strips, the perforated parts comprising at least 30% of the total surface of the band.

6. A method according to claim 1 in which the active material-copper microcrystals mixture contains from 30 to 70% copper microcrystals.

7. A method according to claim 1 in which the active material is cadmium in the form of acicular or arborescent microcrystals.

8. A method according to claim 1 in which the active material is a mixture of cadmium in the form of acicular or arborescent microcrystals and of iron in finely divided condition, said last-named mixture being obtained by electrolysis, using a high current density on the cathode, of a solution which contains cadmium and iron salts, the ratio of iron in said mixture amounting to no more than 30% of the total weight of the active material.

9. A method according to claim 1 in which the active material is a mixture of finely divided cadmium oxide and finely divided iron, the ratio of iron in said last-named mixture amounting to no more than 30% of the total weight of the active material.

10. A method according to claim 1 in which the active material is pulverulent iron.

11. A method according to claim 1 in which the active material is pulverulent magnetic iron oxide $Fe_3O_4$.

12. A method according to claim 1 in which the suspension contains in solution as its viscosity increasing agent less than 10 percent by weight of at least one of the organic products selected from the group consisting of alginates, gelatins, starch and cellulose derivatives.

13. A method according to claim 1, in which the suspension contains in solution as its viscosity increasing agent between about 1 and about 5% of the sodium salt of carboxymethyl cellulose.

14. A method according to claim 1, in which the mixture of copper microcrystals and active material covering both faces and the holes of the band is dried by passing the coated band through a dryer heated by means of infra-red radiations.

15. A method according to claim 1, in which the mixture of copper microcrystals and active material coating both faces and the holes of the band is dried by passing the coated band through a heated dryer inside which a non-oxidizing atmosphere is maintained by continuous introduction of a non-oxidizing gas.

16. Plates for galvanic cells prepared according to the method of claim 1.

References Cited in the file of this patent

UNITED STATES PATENTS

| | | | |
|---|---|---|---|
| 1,857,987 | Twiss et al. | May 10, 1932 |
| 2,075,492 | Zimmerman | Mar. 30, 1937 |
| 2,213,128 | Langguth | Aug. 27, 1940 |
| 2,503,970 | Rupp | Apr. 11, 1950 |
| 2,554,662 | Cowgill | May 29, 1951 |
| 2,565,152 | Wachter et al. | Aug. 21, 1951 |
| 2,639,240 | Ehle | May 19, 1953 |
| 2,677,006 | Ameln | Apr. 27, 1954 |
| 2,681,375 | Vogt | June 15, 1954 |

FOREIGN PATENTS

| 34,501 | Sweden | Mar. 20, 1911 |